US012591251B2

(12) United States Patent
Chang et al.

(10) Patent No.: US 12,591,251 B2
(45) Date of Patent: Mar. 31, 2026

(54) NAVIGATION METHOD AND SYSTEM USING COLOR CODES

(71) Applicant: Korea Aerospace Research Institute, Daejeon (KR)

(72) Inventors: JaeWon Chang, Daejeon (KR); Heemin Shin, Daejeon (KR); Jangho Lee, Daejeon (KR); YongMin Jun, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 89 days.

(21) Appl. No.: 18/632,489

(22) Filed: Apr. 11, 2024

(65) Prior Publication Data

US 2024/0353854 A1    Oct. 24, 2024

(30) Foreign Application Priority Data

Apr. 18, 2023    (KR) ......................... 10-2023-0050682

(51) Int. Cl.
G05D 1/247        (2024.01)
G05D 109/20        (2024.01)
G05D 111/10        (2024.01)

(52) U.S. Cl.
CPC ......... G05D 1/247 (2024.01); G05D 2109/20 (2024.01); G05D 2111/10 (2024.01)

(58) Field of Classification Search
CPC ............... G05D 1/247; G05D 2109/20; G05D 2111/10; G08G 5/21; G08G 5/51; G08G 5/54; G08G 5/57; G08G 5/90; G08G 5/52; B64F 1/002
See application file for complete search history.

(56) References Cited

U.S. PATENT DOCUMENTS

| | | | |
|---|---|---|---|
| 10,088,332 B2 | 10/2018 | Otani et al. | |
| 2022/0068147 A1* | 3/2022 | Girard ...................... | G08G 5/53 |
| 2022/0335842 A1* | 10/2022 | Thiyagarajan ........... | G08G 5/56 |
| 2025/0104419 A1* | 3/2025 | Bageshwar .......... | G06V 10/752 |

FOREIGN PATENT DOCUMENTS

| | | |
|---|---|---|
| JP | 08500555 A | 1/1996 |
| KR | 20160101300 A | 8/2016 |
| KR | 20180015190 A | 2/2018 |
| KR | 101840974 B1 | 3/2018 |
| KR | 20190008807 A | 1/2019 |
| KR | 20190111508 A | 10/2019 |
| KR | 102589830 B1 | 10/2023 |

OTHER PUBLICATIONS

Won-Jin Lee; Design and Implementation of an Optimal Path and Monitoring System for MR-based Urban Air Mobility; Journal of KIIT, vol. 20, No. 5, pp. 123-131; May 31, 2022; pISSn 1598-8619; eISSN 2093-7571; http://dx.doi.org/10.14801/jkiit.2022.20.5.123.

* cited by examiner

*Primary Examiner* — Thomas Ingram
(74) *Attorney, Agent, or Firm* — Downs Rachlin Martin PLLC

(57)        ABSTRACT

Disclosed is a navigation method and system using color codes. The navigation method according to an embodiment of the present disclosure includes: dividing an aircraft path at a vertiport into a plurality of sub-paths based on a branch point; and selectively combining at least some of the plurality of sub-paths and generating a guiding path for an urban air mobility (UAM) to travel at the vertiport based on a departure point and a destination point scheduled for the UAM.

11 Claims, 5 Drawing Sheets

| Departure | Destination | Color code (path) | | | | Remarks |
|---|---|---|---|---|---|---|
| A | B | Blue (Solid line) → | Blue (Solid line) → | Yellow (Dotted line) | | |
| A | C | Blue (Solid line) → | Blue (Solid line) → | Blue (Solid line) | | |
| A | D | Blue (Solid line) → | Red (Diagonal line) → | Blue (Solid line) → | Blue (Solid line) | |
| A | E | Blue (Solid line) → | Red (Diagonal line) → | Red (Diagonal line) | | |
| A | F | Blue (Solid line) → | Red (Diagonal line) → | Yellow (Dotted line) → | Yellow (Dotted line) | |
| A | G | Blue (Solid line) → | Red (Diagonal line) → | Yellow (Dotted line) → | Blue (Solid line) | |

FIG. 2B

NAVIGATION METHOD AND SYSTEM USING COLOR CODES

CROSS-REFERENCE TO RELATED APPLICATIONS

This application claims the benefit of Korean Patent Application No. 10-2023-0050682 filed on Apr. 18, 2023, in the Korean Intellectual Property Office, the entire disclosure of which is incorporated herein by reference for all purposes.

BACKGROUND

1. Field

The following description relates to a line tracer technology for an urban air mobility (UAM) and, more particularly, to a navigation method and system using color codes that stably guides a UAM through a specific color line according to a color code at a vertical takeoff/landing airfield (e.g., vertiport) in a high-density urban area.

2. Description of Related Art

Korean Patent Registration No. 1840974 (Mar. 15, 2018):
    Lane identification system for autonomous drive
    Korean Patent Registration No. 1840974 discloses a lane identification system for autonomous driving that identifies lanes to determine whether a vehicle departs from a road or guide the vehicle to automatically return when it is determined to depart from the road. In this case, the system may identify types of lanes as, for example, dashed lines, solid lines, centerlines, exclusive lanes, and the like, by colors and shapes of the lanes, thereby facilitating lane changes and safe driving overall.

A line tracer may be a representative example of a navigation method for navigating along a set path.

However, a typical line tracer may operate only on a single line and may not perform properly on branches.

Accordingly, there is an urgent need for a technology that may stably guide an urban air mobility (UAM) not only through a single line but also through a branched line to guide the UAM at a vertical takeoff/landing airfield (e.g., vertiport).

SUMMARY

An objective of embodiments of the present disclosure is to provide a navigation method and system using color codes that support accurate and reliable navigation of an urban air mobility (UAM) by changing an attribute of a line tracer at a branch point using colors.

According to an embodiment of the present disclosure, there is provided a navigation method using color codes, including: dividing an aircraft path at a vertiport into a plurality of sub-paths, based on a branch point; and selectively combining at least some of the plurality of sub-paths to generate a guiding path for a UAM to travel at the vertiport, based on a departure point and a destination point scheduled for the UAM.

According to another embodiment of the present disclosure, there is provided a navigation system using color codes, including: a divider configured to divide an aircraft path at a vertiport into a plurality of sub-paths based on a branch point; and a processor configured to, based on a departure point and a destination point scheduled for a UAM, selectively combine at least some of the plurality of sub-paths to generate a guiding path for the UAM to travel at the vertiport.

According to the embodiments described herein, a navigation method and system using color codes may support accurate and reliable navigation of a UAM by changing an attribute of a line tracer at a branch point through colors.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 2A and 2B are diagrams illustrating a guiding path generated according to an embodiment of the present disclosure;

DETAILED DESCRIPTION

Figure 1:
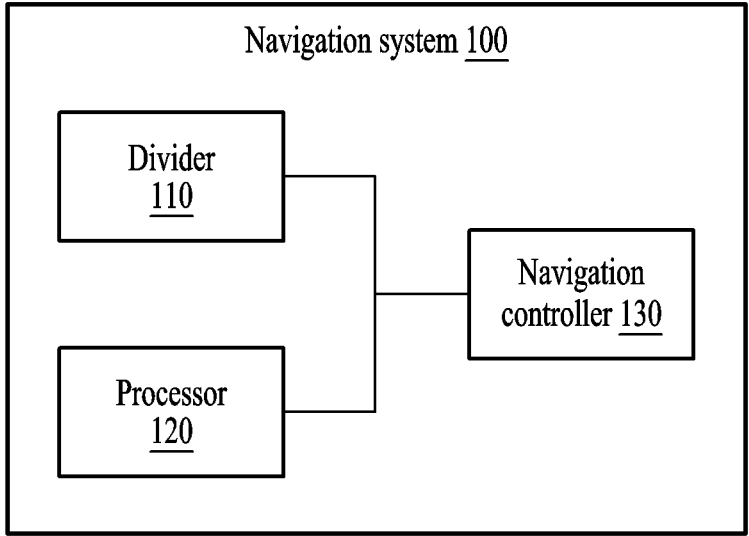
FIG. 1 is a block diagram illustrating a configuration of a navigation system using color codes according to an embodiment of the present disclosure.

Hereinafter, embodiments will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

FIG. 1 is a block diagram illustrating a configuration of a navigation system using color codes according to an embodiment of the present disclosure.

Referring to FIG. 1, according to an embodiment of the present disclosure, a navigation system using color codes (hereinafter simply referred to as a "navigation system" 100) may include a divider 110 and a processor 120. Optionally, the navigation system 100 may further include a navigation controller 130, depending on embodiments.

The divider 110 may divide an aircraft path at a vertical takeoff/landing airfield, a vertiport, into a plurality of sub-paths based on a branch point. That is, the divider 110 may serve to divide, into the plurality of sub-paths, the aircraft path on which an urban air mobility (UAM) may move at the vertiport where the UAM takes off and lands by indexing them for each branch.

The aircraft path described herein may be a concept that encompasses a takeoff taxiway on which a UAM carrying passengers, cargo, and the like moves from a mooring site to a takeoff port, a landing taxiway on which a UAM landed at a landing port moves to a mooring site, a runway on which a UAM requiring a lift runs, and the like.

The UAM, an urban air mobility, may be an urban aviation system configured to transport passengers and cargo by connecting aviation infrastructure with other transportation systems.

The vertiport, a vertical takeoff/landing airfield, may be a terminal where UAMs, vertical takeoff/landing aircrafts, take off, land, and are charged, and passengers get on the UAMs.

When dividing the aircraft path, the divider 110 may divide the aircraft path into the plurality of sub-paths, with each branch point of the aircraft path as a node.

For example, the divider 110 may divide the aircraft path into an aircraft path between a mooring site A and a takeoff/landing port C as sub-path 1; an aircraft path between a first branch point of sub-path 1 and a takeoff/landing port E as sub-path 2; and an aircraft path between a second branch point of sub-path 1 and a takeoff/landing port B as sub-path 3.

The divider 110 may also divide the aircraft path into an aircraft path between a first branch point of sub-path 2 and a takeoff/landing port F as sub-path 4; and an aircraft path between a second branch point of sub-path 2 and a takeoff/landing port D as sub-path 5.

Each branch point may be a connection point that is connected to another aircraft path.

The processor 120 may selectively combine at least some of the plurality of sub-paths, based on a departure point and a destination point that are scheduled for the UAM to generate a guiding path for the UAM to travel at the vertiport. That is, the processor 120 may serve to generate the guiding path along which the UAM travels by selecting and combining specific sub-paths according to a takeoff/landing schedule of the UAM.

When generating the guiding path, the processor 120 may further consider a minimum required time to the destination point, minimum usage of sub-paths to the destination point, congestion on the aircraft path, and the like to generate the guiding path.

For example, in a case where the departure point is the mooring site A and the destination point is the takeoff/landing port F, the processor 120 may select and combine sub-path 1, sub-path 2, and sub-path 4 based on the minimum usage of sub-paths to the destination point to generate the guiding path along which the UAM is to travel.

According to an embodiment, the navigation system 100 may represent each of the sub-paths as a color such that the UAM traveling along the guiding path may navigate more accurately by referring to the color.

To this end, the processor 120 may assign a color code to each of the plurality of sub-paths. In this case, the processor 120 may assign a color code of a first color that is different between adjacent sub-paths.

The color code may refer to a data representation that records and stores information through a specified color, and the processor 120 may represent the sub-paths by assigning, to the sub-paths, different colors that are identified from each other.

In some embodiments, the processor 120 may use identifiers indicating, for example, left, straight (center), right, and the like, which are installed at branch points, instead of color codes, to represent each of the sub-paths separately.

In the above example where the guiding path is generated by a combination of sub-paths 1, 2, and 4, the processor 120 may assign a color of "blue" to sub-path 1, assign a color of "red" that is different from "blue" to sub-path 2 adjacent to sub-path 1, and assign a color of "yellow" that is different from "red" to sub-path 4 adjacent to sub-path 2.

The processor 120 may then visualize the sub-paths within the guiding path by a combination of the first color. That is, the processor 120 may visually provide the guiding path represented by a combination of colors assigned according to a combination of sub-paths.

For example, the processor 120 may visualize the guiding path generated by the combination of sub-paths 1, 2, and 4 as "blue-red-yellow," and allow the UAM to travel more readily and accurately to the destination point along the guiding path visualized with these colors. According to an embodiment, the navigation system 100 may recognize a color of the guiding path and control the UAM to move.

To this end, the navigation system 100 may optionally include the navigation controller 130.

The navigation controller 130 may recognize the first color of a sub-path within the guiding path, on the aircraft path, through a vision camera and a color sensor, and guide the UAM along the guiding path to the destination point. That is, the navigation controller 130 may match the color in the guiding path to a color of the aircraft path recognized by the vision camera and the color sensor, and may control the UAM to move to the destination point along the guiding path.

For example, the navigation controller 130 may identify a color line in an image through the vision camera according to "blue-red-yellow" in the guiding path, and sequentially recognize the colors "blue," "red," and "yellow" of the aircraft path to control the UAM to move along the guiding path to the takeoff/landing port F which is the destination point.

In addition, the navigation controller 130 may identify the color line using the color sensor, in a similar way to an infrared sensor, according to "blue-red-yellow" in the guiding path, and sequentially recognize the colors "blue," "red," and "yellow" of the aircraft path to control the UAM to move along the guiding path to the takeoff/landing port F which is the destination point.

Depending on embodiments, the navigation controller 130 may control to estimate a position of the UAM through markers arranged on a sub-path.

That is, the navigation controller 130 may arrange markers along the sub-path, at predetermined intervals, and estimate a current position of the UAM by identifying a marker that is activated lastly as the UAM has passed therethrough.

A marker described herein may be used to detect the passage of the UAM and emit a signal. Depending on embodiments, the marker may be provided in a specific shape that is recognizable by an identification means such as the vision camera or the color sensor.

The navigation controller 130 may estimate the current position of the UAM by counting the number of markers that emit a signal by being activated within a certain sub-path.

For example, in a case where a marker is arranged at an interval of 10 meters along sub-path 1 that is 160-meter long, and a 12th marker is identified as lastly activated, the navigation controller 130 may estimate that the UAM is located at a position that is approximately 120 meters away from the mooring site A.

The processor 120 may also change the first color of a sub-path through which the UAM has passed to a second color and visualize the sub-path in the second color. That is, the processor 120 may represent a path within the guiding path through which the UAM has passed in the second color that is different from the first color.

For example, in a case where the 12th marker is identified as being lastly activated for sub-path 1 in "blue," the processor 120 may change the color of "blue" of a path of sub-path 1 on which the 12th marker is arranged to the color of "red," which is different from the color of "blue," and visualize the path in "red" to show the current position of the UAM and how the UAM travels clearly and easily at a glance.

According to an embodiment of the present disclosure, there is provided a navigation method and system using color codes that support accurate and reliable navigation of a UAM by changing an attribute of a line tracer, using colors, at a branch point.

According to an embodiment of the present disclosure, the navigation system 100 may support an accurate and reliable navigation service for a flying object or vehicle that travels along a preset path at a vertiport of a UAM.

The vertiport of the UAM may require a more accurate navigation service because a separation distance between flying objects is shorter than that of a general airport.

An existing typical line tracer may not be easy to operate for a branch point, but the navigation system 100 according to an embodiment of the present disclosure may provide an accurate and reliable navigation service by assigning color codes and changing an attribute of the line tracer at each branch point using colors.

Figure 2A:
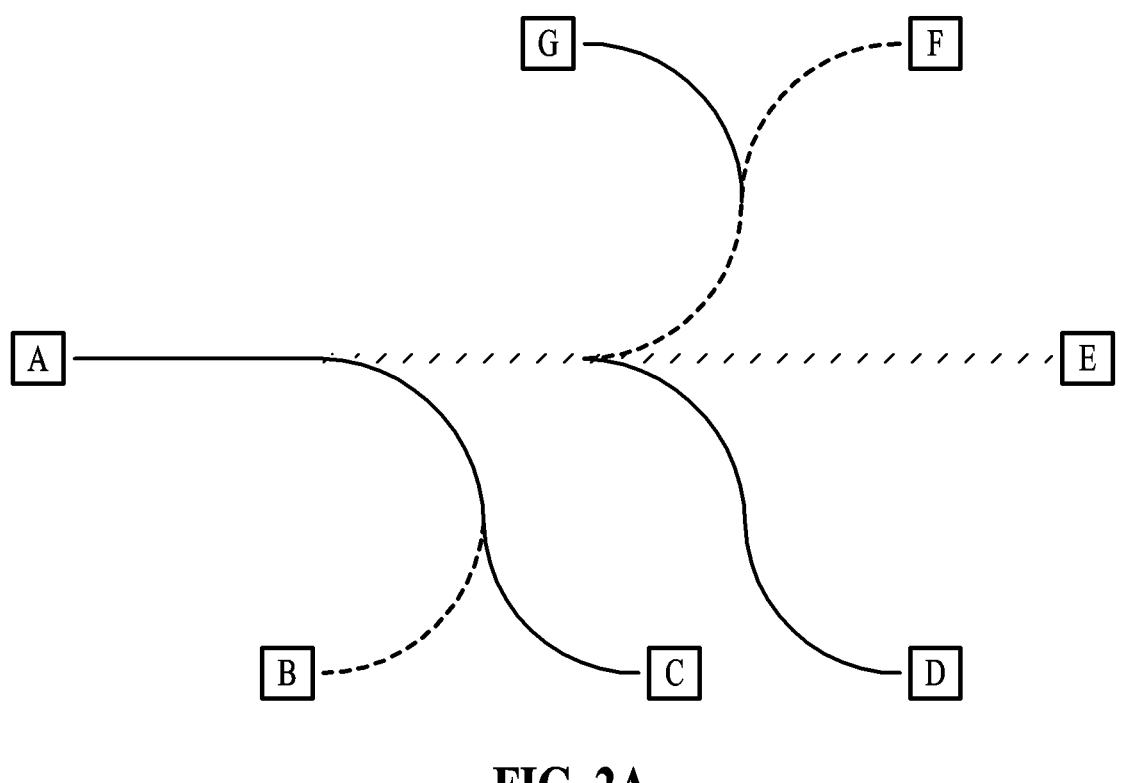

FIGS. 2A and 2B are diagrams illustrating a guiding path generated according to an embodiment of the present disclosure.

The navigation system 100 may divide an aircraft path into a plurality of sub-paths based on a branch point, and may select and combine sub-paths to generate a guiding path based on a departure point and a destination point.

As shown in FIGS. 2A and 2B, the navigation system 100 may divide the aircraft path into an aircraft path between a mooring site A and a takeoff/landing port C as sub-path 1 (blue); an aircraft path between a first branch point of sub-path 1 and a takeoff/landing port E as sub-path 2 (red); and an aircraft path between a second branch point of sub-path 1 and a takeoff/landing port B as sub-path 3 (yellow).

The navigation system 100 may also divide the aircraft path into an aircraft path between a first branch point of sub-path 2 and a takeoff/landing port F as sub-path 4 (yellow); and an aircraft path between a second branch point of sub-path 2 and a takeoff/landing port D as sub-path 5 (blue).

The navigation system 100 may also divide the aircraft path into an aircraft path between a first branch point of sub-path 4 and a takeoff/landing port G as sub-path 6 (blue).

For example, in a case where the departure point is the mooring site A and the destination point is the takeoff/landing port F, the navigation system 100 may select and combine sub-path 1 (blue), sub-path 2 (red), and sub-path 4 (yellow) based on the minimum usage of sub-paths to the destination point to generate the guiding path along which the UAM is to travel.

In addition, the navigation system 100 may sequentially recognize the colors "blue," "red," and "yellow" of the aircraft path using a vision camera according to "blue-red-yellow" in the guiding path and may thereby control the UAM to move along the guiding path to the takeoff/landing port F which is the destination point.

Figure 3:
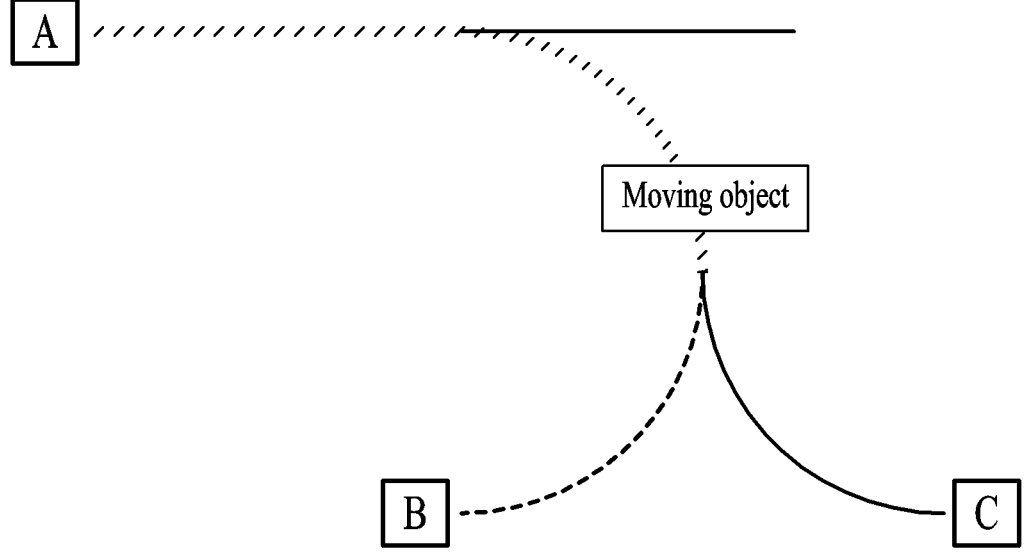
FIG. 3 is a diagram illustrating a marker arranged on a sub-path within a guiding path according to an embodiment of the present disclosure.

FIG. 3 is a diagram illustrating a marker arranged on a sub-path in a guiding path according to an embodiment of the present disclosure.

The navigation system 100 may estimate a current position of a UAM by arranging markers along a sub-path at predetermined intervals and identifying a marker that is activated or recognized lastly as the UAM has passed therethrough.

As shown in FIG. 3, when a marker is arranged at an interval of 10 meters along sub-path 1 that is 160-meter long, and a 12th marker is identified as being lastly activated, the navigation system 100 may estimate that the UAM is located at a position that is approximately 120 meters away from the mooring site A.

When the 12th marker is identified as being lastly activated for sub-path 1 in "blue," the navigation system 100 may change the color of "blue" of a path of sub-path 1 on which the 12th marker is arranged to the color of "red," which is different from the color of "blue," and visualize the path in "red" to show the current position of the UAM and how the UAM travels clearly and easily at a glance.

Hereinafter, a flow of operations performed by the navigation system 100 using color codes will be described in detail below with reference to FIG. 4 according to embodiments of the present disclosure.

A navigation method using color codes according to embodiments of the present disclosure may be performed by the navigation system 100 using color codes.

Figure 4:
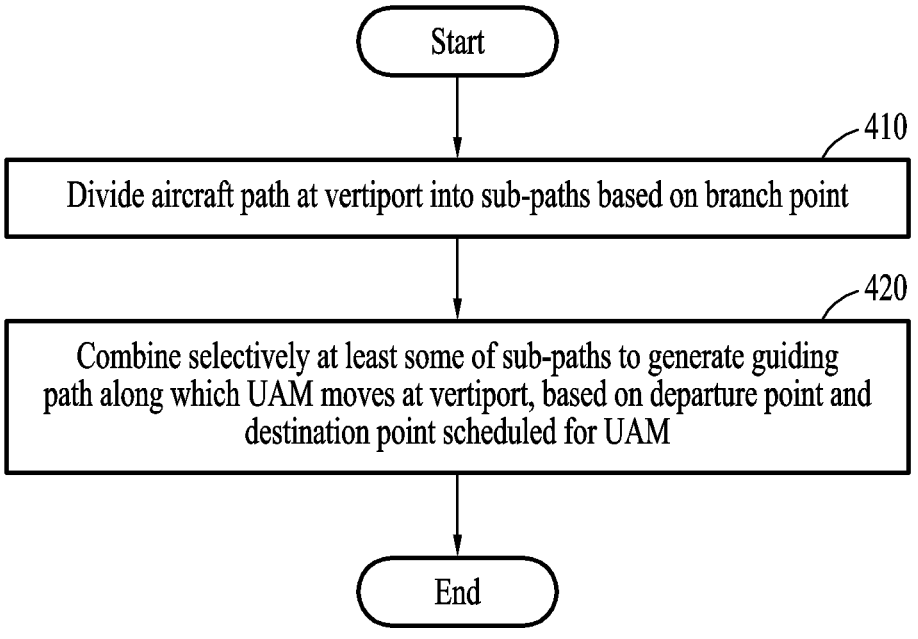
FIG. 4 is a flowchart illustrating a navigation method using color codes according to an embodiment of the present disclosure.

FIG. 4 is a flowchart illustrating a navigation method using color codes according to an embodiment of the present disclosure.

In operation 410, the navigation system 100 may divide an aircraft path at a vertiport into a plurality of sub-paths based on a branch point. Operation 410 may include dividing the aircraft path into the plurality of sub-paths by indexing, for each branch, the aircraft path on which a UAM moves at the vertiport where the UAM takes off and lands.

The aircraft path may be a concept that encompasses a takeoff taxiway on which the UAM carrying passengers, cargo, and the like moves from a mooring site to a takeoff port; a landing taxiway on which the UAM landed at a landing port moves to the mooring site; a runway on which the UAM requiring a lift runs, and the like.

The UAM, an urban air mobility, may be an urban aviation system configured to transport passengers and cargo by connecting aviation infrastructure with other transportation systems.

The vertiport, a vertical takeoff/landing airfield, may refer to a terminal where UAMs, vertical takeoff/landing aircrafts, take off, land, and are charged and checked and repaired, and passengers get on the UAMs.

When dividing the aircraft path, the navigation system 100 may divide the aircraft path into the plurality of sub-paths, with each branch point of the aircraft path as a node.

For example, the navigation system 100 may divide the aircraft path into an aircraft path between a mooring site A and a takeoff/landing port C as sub-path 1; an aircraft path between a first branch point of sub-path 1 and a takeoff/landing port E as sub-path 2; and an aircraft path between a second branch point of sub-path 1 and a takeoff/landing port B as sub-path 3.

The navigation system 100 may also divide the aircraft path into an aircraft path between a first branch point of sub-path 2 and a takeoff/landing port F as sub-path 4; and an aircraft path between a second branch point of sub-path 2 and a takeoff/landing port D as sub-path 5.

Each branch point may be a connection point that is connected to another aircraft path.

In operation 420, the navigation system 100 may selectively combine at least some of the plurality of sub-paths to generate a guiding path for the UAM to travel at the vertiport, based on a departure point and a destination point scheduled for the UAM. Operation 420 may include generating the guiding path along which the UAM is to travel by selecting and combining specific sub-paths according to a takeoff/landing schedule of the UAM.

When generating the guiding path, the navigation system 100 may further consider a minimum required time to the destination point, minimum usage of sub-paths to the destination point, congestion on the aircraft path, and the like to generate the guiding path.

For example, in a case where the departure point is the mooring site A and the destination point is the takeoff/landing port F, the navigation system 100 may select and combine sub-path 1, sub-path 2, and sub-path 4 based on the minimum usage of sub-paths to the destination point to generate the guiding path along which the UAM is to travel.

According to an embodiment, the navigation system 100 may represent each of the sub-paths as a color such that the UAM traveling along the guiding path may travel more accurately by referring to the color.

To this end, the navigation system 100 may assign a color code to each of the plurality of sub-paths. In this case, the navigation system 100 may assign a color code of a first color that is different between adjacent sub-paths.

The color code may refer to a data representation that records and stores information using a specified color, and the navigation system 100 may represent the sub-paths by assigning, to the sub-paths, different colors that are identified from each other.

In some embodiments, the navigation system 100 may use identifiers indicating, for example, left, straight (center), right, and the like, which are installed at branch points, instead of color codes, to represent each of the sub-paths separately.

In the above example where the guiding path is generated by a combination of sub-paths 1, 2, and 4, the navigation system 100 may assign a color of "blue" to sub-path 1, assign a color of "red" that is different from "blue" to sub-path 2 adjacent to sub-path 1, and assign a color of "yellow" that is different from "red" to sub-path 4 adjacent to sub-path 2.

The navigation system 100 may then visualize the sub-paths within the guiding path as a combination of the first color. That is, the navigation system 100 may visually provide the guiding path represented by a combination of colors assigned according to a combination of sub-paths.

For example, the navigation system 100 may visualize the guiding path generated by the combination of sub-paths 1, 2, and 4 as "blue-red-yellow," and allow the UAM to travel more readily and accurately to the destination point along the guiding path visualized with the corresponding colors.

According to an embodiment, the navigation system 100 may recognize a color of the guiding path and control the UAM to move.

To this end, the navigation system 100 may recognize the first color of a sub-path within the guiding path, on the aircraft path, through a vision camera and a color sensor, and guide the UAM along the guiding path to the destination point. That is, the navigation system 100 may match the color in the guiding path to a color of the aircraft path recognized by the vision camera and the color sensor, and may control the UAM to move along the guiding path to the destination point.

For example, the navigation system 100 may identify a color line in an image through the vision camera according to "blue-red-yellow" in the guiding path, and sequentially recognize the colors "blue," "red," and "yellow" of the aircraft path to control the UAM to move along the guiding path to the takeoff/landing port F which is the destination point.

The navigation system 100 may also identify the color line using the color sensor, in a similar way to an infrared sensor, according to "blue-red-yellow" in the guiding path, and sequentially recognize the colors "blue," "red," and "yellow" of the aircraft path to control the UAM to move along the guiding path to the takeoff/landing port F which is the destination point.

Depending on embodiments, the navigation system 100 may control to estimate a position of the UAM through markers arranged on a sub-path.

That is, the navigation system 100 may arrange markers along the sub-path, at predetermined intervals, and estimate a current position of the UAM by identifying a marker that is activated lastly as the UAM has passed therethrough.

A marker described herein may be used to detect the passage of the UAM and emit a signal. According to an embodiment, the marker may be provided in a specific shape that is recognizable by an identification means such as the vision camera or the color sensor.

The navigation system 100 may estimate the current position of the UAM by counting the number of markers that emit a signal by being activated within a certain sub-path.

For example, in a case where a marker is arranged at an interval of 10 meters along sub-path 1 that is 160-meter long, and a 12th marker is identified as being lastly activated, the navigation system 100 may estimate that the UAM is located at a position that is approximately 120 meters away from the mooring site A.

The navigation system 100 may also change the first color of a sub-path through which the UAM has passed to a second color and visualize the sub-path in the second color. That is, the navigation system 100 may represent a path within the guiding path through which the UAM has passed in the second color that is different from the first color.

For example, when the 12th marker is identified as being lastly activated for sub-path 1 in "blue," the navigation system 100 may change the color of "blue" of a path of sub-path 1 on which the 12th marker is arranged to the color of "red," which is different from the color of "blue," and visualize the path in "red" to show the current position of the UAM and how the UAM travels clearly and easily at a glance.

According to an embodiment of the present disclosure, there is provided a navigation method and system using color codes that support accurate and reliable navigation of a UAM by changing an attribute of a line tracer, using colors, at a branch point.

The embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blueray discs; magneto-optical media such as optical discs; and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter. The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A navigation method using color codes that allows an urban air mobility (UAM) to automatically traverse a guiding path through an aircraft path having a branch point, the navigation method comprising:

dividing the aircraft path at a vertiport into a plurality of sub-paths, based on the branch point, so that differing ones of the plurality of sub-paths at the branch point having differing assigned colors;

automatedly selectively combining at least some of the plurality of sub-paths to generate the guiding path for the UAM to travel at the vertiport, based on a departure point and a destination point scheduled for the UAM, wherein the guiding path traverses the branch point and is composed of a plurality of colored segments; and automatedly navigating the UAM along the aircraft path based on the guiding path, wherein the automatedly navigating includes:

sensing, as the UAM traverses at least a portion of the aircraft path and using a vision camera having a color sensor, color codes on markers along the aircraft path;

matching the sensed color codes on the markers to the colored segments of the guiding path so as to differentiate between differing ones of the plurality of sub-paths branching from the branch point; and controlling movement of the UAM along the aircraft path based on the matching of the sensed color codes to the colored segments.

2. The navigation method of claim 1, further comprising:

assigning the color code to each of the plurality of sub-paths, wherein the assigning comprises assigning first colors that differ between adjacent sub-paths; and visualizing the sub-paths in the guiding path by a combination of the differing first colors of the adjacent sub-paths.

3. The navigation method of claim 2, further comprising:

recognizing, through the vision camera and the color sensor, the first color of any of the plurality of sub-paths within the guiding path, on the aircraft path, and guiding the UAM along the guiding path to the destination point.

4. The navigation method of claim 2, further comprising:

arranging the markers along a sub-path at predetermined intervals; and estimating a current position of the UAM by identifying a marker that is activated lastly as the UAM has passed therethrough.

5. The navigation method of claim 4, further comprising:

changing the first color of at least one of the plurality of sub-paths through which the UAM has passed to a second color and visualizing the sub-path in the second color.

6. A navigation system using color codes that allows an urban air mobility (UAM) to automatically traverse a guiding path through an aircraft path having a branch point, the navigation system comprising:

a divider configured to divide the aircraft path at a vertiport into a plurality of sub-paths based on the branch point, so that differing ones of the plurality of sub-paths at the branching point have differing assigned colors; and a processor configured to automatedly selectively combine at least some of the plurality of sub-paths to generate the guiding path for the UAM to travel at the vertiport, based on a departure point and a destination point scheduled for the UAM, wherein the guiding path traverses the branch point and is composed of a plurality of colored segments; and a navigation controller configured to automatedly navigate the UAM along the aircraft path based on the guiding path, wherein the automatic navigation includes:

sensing, as the UAM traverses at least a portion of the aircraft path and using a vision camera having a color sensor, color codes on markers along the aircraft path;

matching the sensed color codes on the markers to the colored segments of the guiding path so as to differentiate between differing ones of the plurality of sub-paths branching from the branch point; and controlling movement of the UAM along the aircraft path based on the matching of the sensed color codes to the colored segments.

7. The navigation system of claim 6, wherein the processor is configured to:

assign the color code to each of the plurality of sub-paths, wherein the processor is configured to assign first colors that differ between adjacent sub-paths; and visualize the sub-paths in the guiding path by a combination of the differing first colors of the adjacent sub-paths.

8. The navigation system of claim 7, wherein the navigation controller is configured to:

recognize, a through the vision camera and the color sensor, the first color of any of the plurality sub-paths within the guiding path, on the aircraft path, and guide the UAM along the guiding path to the destination point.

9. The navigation system of claim 7, wherein the navigation controller is configured to:

arrange the markers along a sub-path at predetermined intervals, and estimate a current position of the UAM by identifying a marker that is activated lastly as the UAM has passed therethrough.

10. The navigation system of claim 9, wherein the processor is configured to:

change the first color of at least one of the plurality of sub-paths through which the UAM has passed to a second color and visualize the sub-path in the second color.

11. A non-transitory computer-readable storage medium storing instructions that, when executed by a processor, cause the processor to perform the navigation method of claim 1.

* * * * *